United States Patent [19]

Merritt

[11] 4,289,353
[45] Sep. 15, 1981

[54] COMBINATION BELLY DUMP/END DUMP VEHICLE

[76] Inventor: Jackie A. Merritt, P.O. Box 443, Rocksprings, Tex. 78880

[21] Appl. No.: 36,313

[22] Filed: May 7, 1979

[51] Int. Cl.³ .............................................. B60P 1/16
[52] U.S. Cl. .................................. 298/17.5; 298/17.8; 298/22 R; 298/30; 298/10; 414/728
[58] Field of Search ................ 298/1 R, 5, 7, 10, 17.5, 298/17.8, 19 R, 22 R, 22 P, 22 D, 22 AE, 29, 30, 22 J, 24, 27; 414/728, 742, 469, 474

[56] References Cited

U.S. PATENT DOCUMENTS

| | | | |
|---|---|---|---|
| 1,484,327 | 2/1924 | Heil | 298/17.5 |
| 2,718,429 | 9/1955 | Birdwell . | |
| 2,738,633 | 3/1956 | Bestland et al. | 298/10 X |
| 2,870,923 | 1/1959 | Jewell, Jr. | 298/22 R X |
| 2,983,548 | 5/1961 | Harbers et al. . | |
| 3,224,811 | 12/1965 | Horvath | 298/10 |
| 3,232,666 | 2/1966 | Hutchinson . | |
| 3,610,690 | 10/1971 | Mengel | 298/22 R X |
| 3,633,971 | 1/1972 | Berky et al. | 298/17.5 X |

FOREIGN PATENT DOCUMENTS

| | | | |
|---|---|---|---|
| 556840 | 10/1943 | United Kingdom | 298/17.5 |
| 682143 | 11/1952 | United Kingdom | 298/17.5 |

*Primary Examiner*—Frank E. Werner
*Attorney, Agent, or Firm*—Gunn, Lee & Jackson

[57] ABSTRACT

A vehicle is shown having a hopper mounted thereon capable of dumping materials contained within the hopper over the end of the hopper or through the bottom of the hopper. Dumping over the end of the hopper is accomplished by lifting the front end of the hopper and sequentially pivoting the rear end of the hopper upon an initial pivot point and a subsequent pivot point in a manner which minimizes the risk of the vehicle capsizing by maintaining a low center of gravity. Dumping through the bottom of the hopper is accomplished through the use of a clam shell gate covering an opening in the bottom of the hopper. The vehicle may be interchangeably used as a rear dump vehicle or a belly dump vehicle, more safely used upon hazardous terrains, and still carry the maximum load capacity allowed.

6 Claims, 3 Drawing Figures

COMBINATION BELLY DUMP/END DUMP VEHICLE

BACKGROUND OF THE INVENTION

The invention relates to dump vehicles which are used for transporting sand, gravel or other loose materials which are relatively heavy. Specialized vehicles for this purpose are necessary due to the many varied materials which must be carried and the many varying conditions under which the vehicles must operate. The vehicles are primarily used in general construction work where the conveying of sand, concrete, rocks, earth, and such other loose materials is often required. Some uses of the transported material, such as the spreading of earth or gravel, require the use of a belly dump vehicle. These are vehicles which are equipped to transport a load over a distance and to empty the load through the bottom or belly of the hopper carrying the load. Other uses, such as the placing of large amounts of material in particular locations, require the use of end dump vehicles. End dump vehicles are dump vehicles which empty the contents of the bed by raising the front end of the bed and letting the contents slide through the tail gate or over the end of the bed. Because of the completely different structure normally attendant to end dump type vehicles and belly dump type vehicles, there are some tasks which each type of vehicle simply cannot economically perform. Construction companies normally own, rent or otherwise operate a plurality of different specialized dump vehicles in order to accomplish the different tasks required in construction work. Alternatively, construction companies sometimes use dump vehicles for uses for which they have not been primarily designed. It is, for example, a common occurrence to see an end dump vehicle being used to lay long strips of earth or gravel, rather than the more efficient belly dump vehicle. This is due to the fact that such equipment must be continually used to justify their purchase cost even if such use is not always the one for which they were designed.

Two different catagories of dump vehicles have been developed in response to these conditions. First, extremely specialized dump vehicles are purchased and used by large companies which can be assured of sufficient demand for the specialized dump vehicle to insure that the specialized dump vehicle will only be used for one specific task. There vehicles have many refinements and are extremely efficient at the jobs for which they were designed. A second type of dump vehicle which has been developed are dump vehicles which are designed primarily for a single type of use, but are also intentionally designed to be at least marginally efficient for other types of uses. An example of this type of vehicle is an end dump truck which is useful in the laying of layers of earth as described above.

The small construction company or the individual who wishes to purchase only one or only a few dump vehicles which will necessarily be used for a multitude of purposes is put at an extreme disadvantage. Present day dump vehicles confine his choice to either an end dump type vehicle, which will necessarily be inefficient in the performance of belly dump type vehicle tasks, or the purchase of a belly type dump vehicle, which will be inefficient in the performance of end dump type vehicle tasks. Therefore, a dump vehicle is needed which can be efficiently operated in both belly dump and end dump modes.

An additional problem which current designs of end dump vehicles do not satisfactorily solve is the propensity of end dump vehicles to capsize if used upon soft or uneven ground. Most end dump vehicles operate by raising the front end of the bed so that the contents will slide out or over a rear end of the bed. Due to structural design, which will be discussed below, this involves placing the major portion of the weight of the bed and its contents upon the rear wheels. As the bed is rotated over the rear wheels, any slight angular deviation of the ground from the ideal horizontal surface is communicated to the upraised bed. The longer the bed, the greater the effect of the angular deviation thereon and the more unstable the entire truck. Soft or marshy ground can add to the problem. A means is needed to stabilize end dump vehicles during the process of dumping.

DESCRIPTION OF THE PRIOR ART

Birdwell, U.S. Pat. Nos. 2,718,429, and Harbers, 2,983,548, both show typical end dump vehicles. Each shows an end dump type vehicle without a belly dump means and each shows the bed as pivoting upon a single axis when dumping is being carried out. The long flat beds as disclosed in Birdwell and Harbers are made necessary by governmental weight distribution regulations discussed in greater detail below. These long flat beds accentuate the instability problem which occurs in end dump type vehicles during dumping. This occurs as a result of the high arc and resulting leverage created by the high center of gravity upon the vehicle if the vehicle is tilted during dumping. While both Birdwell and Harbers show improvements upon the basic end dump type vehicle, they neither disclose sequential pivoting of the bed upon different pivots nor disclose a combination belly dump/end dump vehicle as is disclosed herein.

Hutchinson, U.S. Pat. No. 3,232,666, shows an end dump vehicle with substantial modifications directed primarily toward obtaining a better distribution of the weight load in order to comply with different governmental regulations. Regulations established by governmental units typically allow a proportionally greater weight to be transported by a vehicle as the distance between the extreme of any group of two or more axles becomes larger. For example, the overall gross weight on a group of two or more consecutive axles which is allowable in the State of Texas may be calculated by application of the following formula:

$$W = 500 \text{ lbs.} \left( \frac{LN}{N-1} = 12N + 36 \right)$$

where:
  W = overall gross weight on any group of two or more consecutive axles to the nearest 500 lbs.;
  L = distance in feet between the extreme of any group of two or more consecutive axles; and
  N = number of axles in group under consideration.
(There are certain exceptions and limits upon this formula as it is applied by the Texas Department of Public Safety.) It is thus seen that the greater the value of L, the greater legally permissible load may be carried upon the public highways. It is, therefore, further seen that mere mechanical efficiency cannot be the sole goal of the present invention, but that the satisfaction of certain arbitrary governmental regulations is also a part thereof.

Hutchinson deals with these weight distribution requirements by mounting a tilting dump bed upon a trailer chassis such that the bed may be alternatively positioned for proper weight distribution during travel upon regulated highways and for dumping over a rear end of the hopper. This is accomplished in Hutchinson by sliding the bed back to a pivot point at the furtherest end of the rear set of wheels when dumping is required. Hutchinson does not deal with the high center of gravity of the load during emptying of the bed.

The invention described in the present application solves the problem in a different manner. Rather than sliding a bed to a single end pivot point, the present invention sequentially pivots a hopper about two points, the sequential pivoting advancing the hopper from an advantageous weight distribution made to the rear of the chassis, which is an advantageous end dump mode.

SUMMARY OF THE INVENTION

It is an object of the instant invention to provide a dump vehicle which is capable of either end dumping or belly dumping the materials transported within its hopper.

It is another object to provide a sequentially pivoting end dump vehicle which may be operated to safely dump the material transported therein without danger of the dump vehicle capsizing. This is accomplished by sequentially pivoting the hopper portion of the dump vehicle so that during initial lifting of the front end of the hopper, while the full weight of the load is still within the hopper, the rotation of the hopper is about a very stable point of the dump vehicle. Later in the dump cycle, the partially emptied hopper pivots about a second point upon the dump vehicle so as to completely empty the hopper. The added stability incurred by this process is extremely important when end dumping is designated to occur upon marshy or sandy areas.

It is yet a further object of the invention to design a dump vehicle which can most efficiently comply with commercial vehicle size and weight requirements as established by the various governmental units within the United States while carrying the maximum loads.

It is yet a further object to provide an end dump type vehicle in which the hopper is initially pivoted upon a near point and subsequently pivoted upon a far point such that the work performed by the lifting means is substantially less then would be required to pivot the hopper about a single point.

These and other objects are achieved by providing a structure and method of sequentially pivoting a hopper upon more than one pivot point during end dumping and by providing the hopper with a belly dump means, all in the manner described below.

DESCRIPTION OF THE PREFERRED EMBODIMENT

Figure 1:
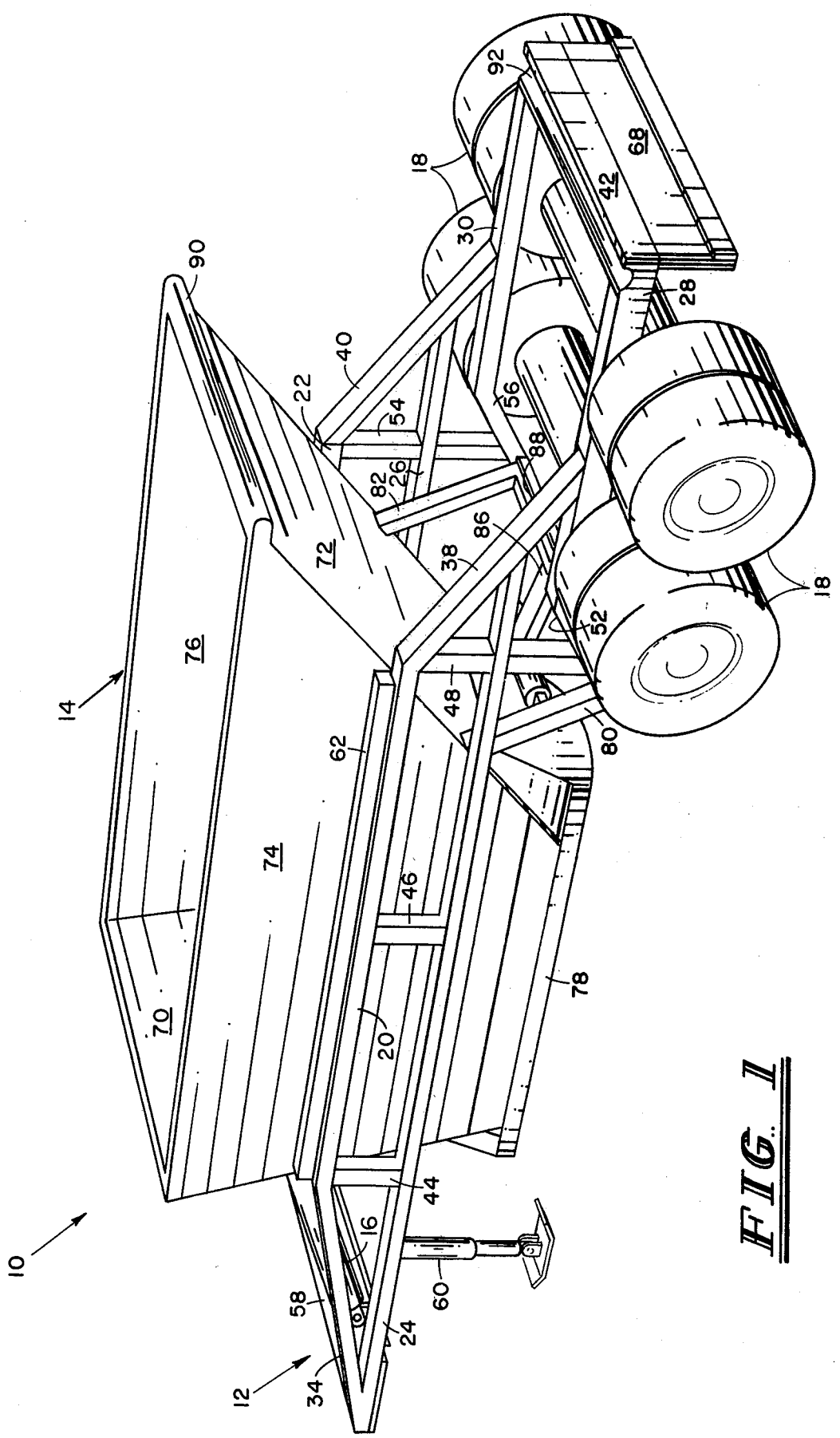
FIG. 1 is a side view of the combination belly dump-/end dump vehicle.

Referring to FIG. 1, there is shown a combination belly dump/end dump vehicle 10 hereinafter referred to as combination dump vehicle 10. The main structural components are a frame 12, a hopper 14, a ram 16 and wheels 18. It should be realized throughout the description of the preferred embodiment that forward refers toward the ram 16 and rear refers toward the wheels 18.

The major longitudinal elements of the frame 12 are upper transoms 20 and 22, lower transoms 24 and 26, and rear beams 28 and 30. The forward ends of left upper transom 20 and left lower transom 24 are connected by left forward truss 34. The forward ends of right upper transom 22 and right lower transom 26 are connected by right forward truss 36 (not shown). In a similar fashion, the rear ends of left upper transom 20 and left lower transom 24 are connected by rear left truss 38 and the rear ends of right upper transom 22 and right lower transom 26 are connected by right rear truss 40.

The rear trusses 38 and 40 extend in a straight line beyond the lower transoms 24 and 26 to connect to rear beams 28 and 30 as shown in FIG. 1. The rear ends of the left rear beam 28 and the right rear beam 30 are connected by rear cross support 42.

Figure 2:
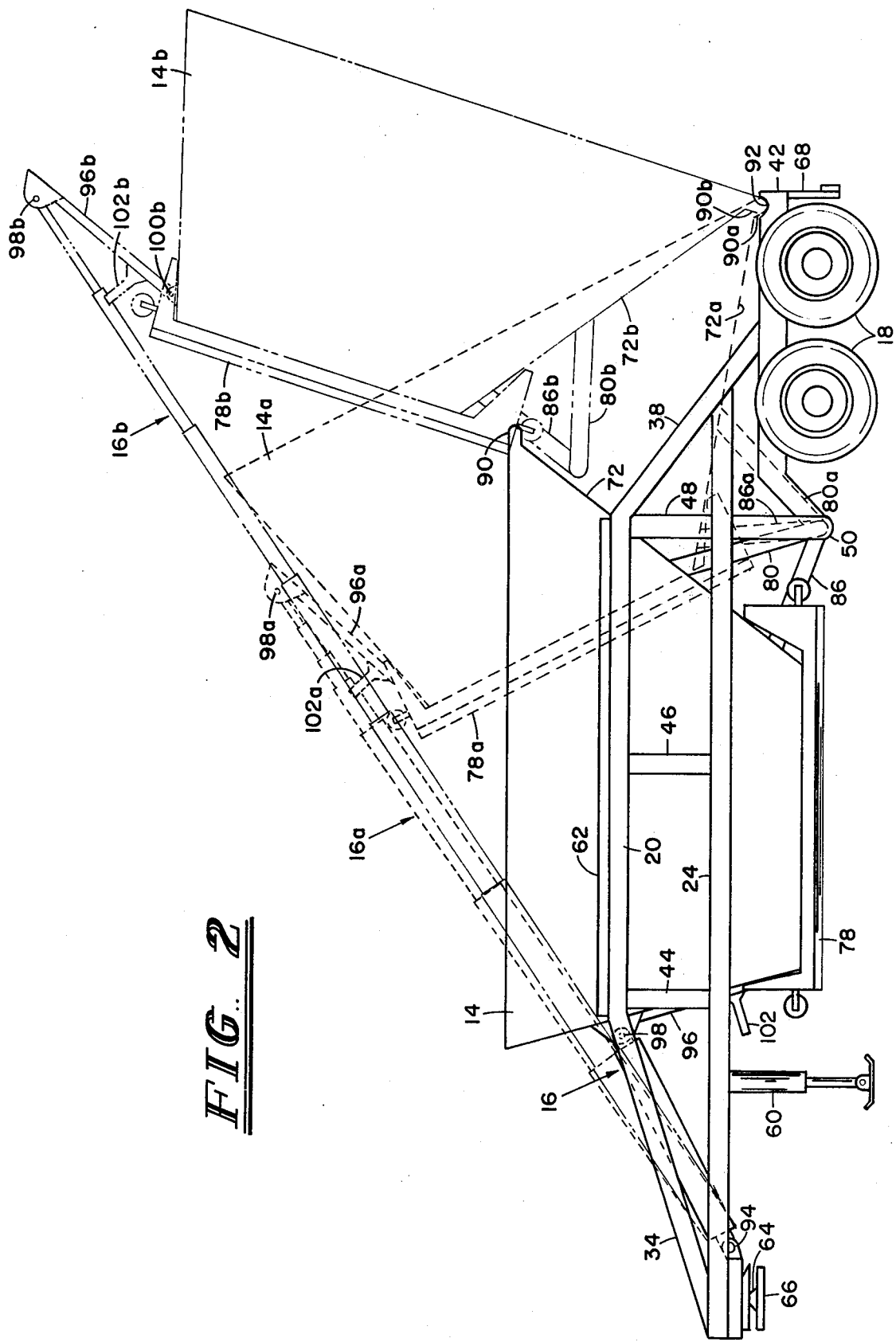
FIG. 2 is a side view of the vehicle of FIG. 1 showing the hopper in three different phases of its end dump process.

Referring to FIG. 2, left first strut 44 and left second strut 46 and left third strut 48 all support the left upper transom 20 upon the left lower transom 24. Left third strut 48 continues downward through the left lower transom 24 until it joins with a pivot beam 50 (shown in FIG. 2) and a left pivot support 52. As shown in FIG. 1, right third strut 54 likewise continues past right lower transom 26 to join the right end of the pivot beam 50 and a lower end of right pivot support 54.

The front ends of the lower transoms 24 and 26 are joined by a forward cross member 58. These above listed elements constitute a complete frame 12. Other members may be attached to the frame 12, such as leg 60, fifth wheel 64, plate 66, and rear bumper guard 68, all as shown in FIGS. 1 and 2. The frame 12 may be mounted upon wheels 18 in many different fashions in approximately the position shown.

The hopper 14 is comprised of a front wall 70, a rear wall 72, a left sidewall 74 and a right sidewall 76. A clam shell gate 78 is located upon the bottom of the hopper 12. The clam shell gate 78 may be operated hydraulically or pneumatically. Both the clam shell gates 78 and its means of operation are known in the art and hence are not fully described. A left support member 62 and a right support member 64 are attached to the sidewalls 74 and 76, respectively. The support members 62 and 64 fit securely upon upper transoms 22 and 24, respectively, of the frame 12 when the hopper is placed within the frame as shown in FIG. 1. The support members 62 and 64 allow the hopper 14 to rest securely upon the frame 12 in a manner such that the hopper 14 may be lifted off the frame 12 as is more fully described below.

Four appendages are attached to the rear wall of the hopper 72; upper hopper beams 80 and 82 and lower hopper beam 84, 86, all located upon the rear wall 72 as shown. The rear end of left front upper hopper beam 80 joins a left end of first pivot bar 88 a short distance from the rear wall 72. The rear end of right upper hopper beam 82 likewise joins with the right end of first pivot bar 88. Pivot bar 88 is supported by the lower hopper beam 84, a lower end of which joins the lower part of the rear wall of the hopper 72 and an upper end of which joins the pivot bar 88 at the pivot bar's mid-point. The pivot beams 80 and 82 and first pivot bar 88 are typically composed of steel and thus form a very stable structure upon the rear wall of the hopper 72. When the forward end of the hopper 14 is raised, the first pivot bar 88 pivots upon the pivot beam 50 of the frame 12. All supporting elements of the hopper 14 and frame 12 are constructed of such materials as to withstand the weight of the hopper 14 as its load is transferred to and rotated upon the pivot beam 50 and the first pivot bar 88.

A second pivot bar 90 is located upon the upper end of the rear wall 72 and a rear groove 92 is located upon rear cross support 42 of the frame 12. The second pivot bar 90 is designed to fit securely within rear groove 92 at such time as it may be rotated into such a position.

The only binding connection between the frame 12 and the hopper 14 is a ram 16. The ram 16 is typically a telescopic hydraulic type ram and is a common device upon dump vehicles. The forward end of the ram 16 is attached to the forward cross member 58 and the rear end of the ram 16 is attached to the front wall of the hopper 70 in such a manner that as the ram 16 is hydraulically extended it exerts a rearward and upward force upon the hopper 12.

Referring to FIG. 2, a lower end of ram 16 is connected to the forward end of frame 12 by lower ram hinge 94 attached to the forward cross member 58. The upper end of ram 16 is connected to hopper 14 by a lift arm 96. The upper end of the lift arm 96 is connected to the upper end of ram 16 by means of an upper ram hinge 98 and the lower end of the lift arm 96 is attached to the hopper 14 by lift arm hinge 100. A lift arm support 102 protrudes from the forward side of the lift arm as shown.

Figure 3:
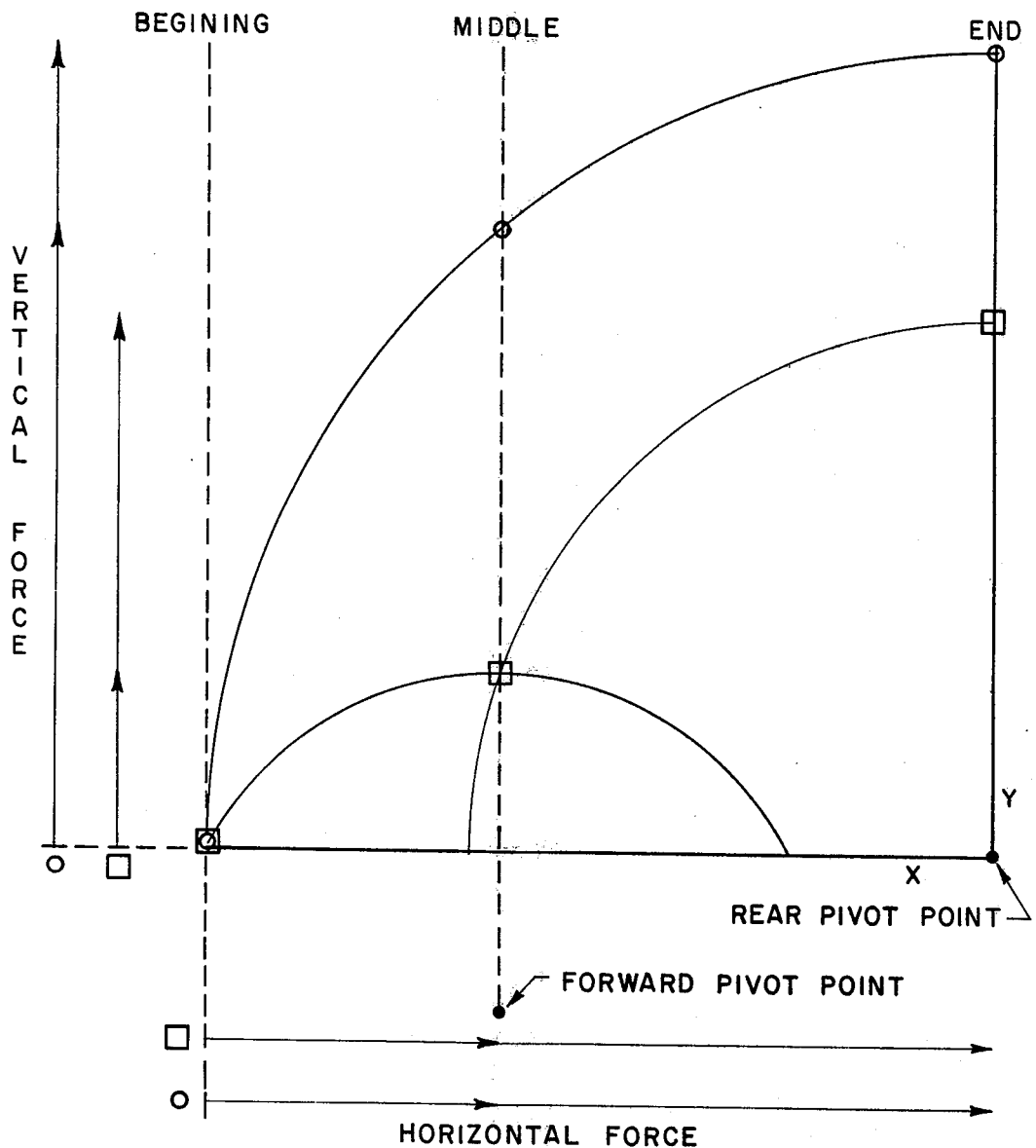
FIG. 3 is a graph illustrating the movement of the center of gravity of a hopper as described herein as the hopper is sequentially pivoted during end dumping and the movement of the center of gravity of a second hopper as is presently accomplished during end dumping under the prior art.

Referring to FIG. 3, there is shown an illustrative graph wherein an X axis representing horizontal distance and a Y axis representing vertical distance are located. The square object therein represents the center of gravity of the hopper 14 in the invented combination belly dump/end dump vehicle 10. The round object therein represents the center of gravity of a hopper in currently available end dump vehicles. In order to distribute the load weight in accordance with the governmental regulations described above, end dump vehicles must place the center of gravity of their hoppers well forward of the rear end of the rear set of wheels. This horizontal location of the center of gravity for such hoppers prior to the initiation of end dumping is indicated upon the X axis in FIG. 3 by a dotted line labeled "begining". In order to completely dump the contents of a hopper so located over the hopper's rear end and over the rear end of the vehicle requires that the hopper be rotated about a point placed just to the rear of the rear set of wheels. This point is labeled in FIG. 3 as "Rear Pivot Point".

To rotate the circular object upon a spoke about the Rear Pivot Point from the beginning to an end located directly above the Rear Pivot Point requires a certain amount of force, expressed in Vertical Force lines and Horizontal Force lines. (The distance units, weight units and force units represented within the graph shown in FIG. 3 are unimportant. The figures therein are merely representative and illustrative of the type of calculations being discussed.)

An alternative fashion of moving the center of gravity of the hopper from the beginning position to the end position is illustrated through the use of the square symbol in FIG. 3. The alternative route involves rotating the center of gravity about a Forward Pivot Point until a "middle" position upon the X axis is reached. At the middle position, the arc described about the Forward Pivot Point is intersected by an arc described about the Rear Pivot Point. The center of gravity of the hopper leaves the Forward Pivot Point arc at the middle position and is transferred to an arc described about the Rear Pivot Point. The center of gravity of the hopper, as represented by the square, is then rotated about the Rear Pivot Point until it reaches the end position along the X axis. Upon attaining this position, the entire contents of the hopper will have been dumped over its rear end.

It is seen that to rotate the square object about a Forward Pivot Point as located in FIG. 3 and subsequentially to rotate it about the Rear Pivot Point to an end position along the X axis in the manner shown requires a lesser Vertical Force and thus a lesser total force than the rotation of the equivalently weighted circular object between the same beginning and end points along the X axis. It is also seen that to move the circular object from the beginning to the end requires that the circular object be rotated much further above the Y axis origin than is necessary for the square object. Both of these advantages are due to the shorter radius required to reach from the Rear Pivot Point to the Forward Pivot Point (as illustrated by the square object) than is required to reach from the Rear Pivot Point to the beginning position (as is illustrated by the round object).

The integrity of the above statements may be proven through the use of geometric proofs and classical physics. The present invention, utilizing the novel structure described above, utilizes these principles to achieve improvements upon prior dump vehicles.

The means of rotating a hopper's center of gravity utilized by prior art end dump vehicles is similar to the pathway represented in FIG. 3 by the circular object. These prior art end dump vehicles utilize the lower rear of a the hopper and the upper rear of the dump vehicle frame as a second pivot point as described in FIG. 3. Thus, upon the front end of the hopper being raised to dump the load, the center of gravity of the hopper rotates about the second pivot point in the manner shown in FIG. 3 by the circular object. Such a high center of gravity may cause the prior end dump vehicles to overturn in the event of unlevel or unstable soil conditions.

As is shown in FIG. 2, the invented combination dump vehicle 10 moves the center of gravity of its hopper similarly to that manner illustrated by the square object in FIG. 3. The pivot beam 50 operates similarly to the Forward Pivot Point of FIG. 3. The rear groove 92 operates similarly to Rear Pivot Point of FIG. 3. The three phases of the combination dump vehicle 10 operation may be best understood by observing the three sequential positions of the hopper 14, 14a and 14b as shown in FIG. 2. The center of gravity of the hopper 14, 14a, and 14b is analogous to the square center of gravity positions shown in the beginning, middle and end positions respectively of FIG. 3. Portions of the combination dump vehicle 10 which move during end dumping have been numbered as follows: beginning position—original numbering, middle position—original number plus "a", and end position—original number plus "b".

Initially, as the ram 16 expands, it pushes hopper 14 backwards and upwards. Because hopper 14 is firmly hinged upon the pivot beam 50 and because the ram 16 is positioned so as to exert both upward and backward force upon the hopper 14, the hopper 14 rotates about the pivot beam 50 until the hopper 14 reaches a middle position indicated by 14a. In that position, the second pivot bar 90a contacts the rear groove 92 located upon the frame 12. Any further extension of the ram 16 shifts the weight of the hopper 14a from the pivot beam 50 and upon the second pivot bar 90a and rear groove 92. Upon further and final extension of the ram 16, the hopper 14c reaches the position indicated in FIG. 3. In this mode, the hopper 14b is completely dumped of all of its contents and may be returned to the beginning position for highway travel.

Note that between the beginning position and the end position the lift arm hinge 102 comes into contact with a side of the ram 16 and is utilized to insure smooth passage of the hopper and to protect the clam shell gate 78b from contact with the ram 16. After passing the middle position, the lift arm 96b rotates away from the hopper 14b upon lift arm hinge 100b. Not all hopper 14—ram 16 modes require the use of a lift arm 96. The hopper 14—ram 16 mode described in the drawings requires a lift arm 96 to enable the arm 16 to push the hopper 14b completely to its end position without being blocked by the clam shell gate 78b.

It is thus seen that the above described structure may end dump its contents without raising the center of gravity of the hopper 14 as high as is necessary in current end dump vehicles. It is further seen that by locating the ram 16 and the Rear Pivot Point (second pivot bar 90) in the manner shown, a combination dump vehicle 10 may be constructed in which the hopper walls 70, 72, 74 and 76 may be sloped to allow both effective bottom dumping and effective end dumping.

I claim:

1. A combination belly dump/end dump vehicle for hauling material comprising:
   a frame mounted upon wheels, said frame containing a first pivot support and a second pivot support, wherein said first pivot support is at least level with or lower than said second pivot support;
   a hopper for containing said material, said hopper having gate means located upon a bottom thereof for dumping from a bottom side everything from said hopper and at least one telescopic hydraulic ram for raising a front end of said hopper, said telescopic hydraulic ram being attached to said hopper by hopper lifting means, a lower end of said hopper lifting means being rotatably attached to a front end of said hopper and an upper end of said hopper lifting means being rotatably attached to an upper end of said telescopic hydraulic ram,
   said hopper being located on said frame such that upon raising a front end of said hopper said material dumps out of a rear end of said hopper and over a rear of said frame, said hopper additionally comprising a first pivot means and a second pivot means, wherein said first and second pivot means alternately engage said first and second pivot supports of said frame and at least one of said pivot means engages at least one pivot support at all times during the dumping process.

2. The vehicle of claim 1 wherein said first pivot means and said second pivot means are located upon a rear side of said hopper, said hopper being rotatable upon said frame such that when said front end of said hopper is initially raised by said hydraulic ram for raising said first pivot means rotates upon said first pivot support, said second pivot means being located such that upon said front end of said hopper being further raised, said first pivot means disengages from said first pivot support and said second pivot means rotates upon said second pivot support so that substantially all of said material is dumped from said hopper when said front end of said hopper is sufficiently raised.

3. The vehicle of claim 2 wherein said first pivot support is located in front of any said wheels which are located behind a rear end of a horizontal resting position of said hopper and said second pivot support is located behind at least one pair of said wheels which are located behind said rear end of said horizontal resting position of said hopper.

4. The vehicle of claim 2 wherein center of gravity of said hopper is sequentially rotated about said first pivot support and said second pivot support.

5. The vehicle of claim 4 wherein said hopper and said frame are further constructed and arranged so that said hopper may fit securely within said frame without being fastened to said frame.

6. The vehicle of claim 1 wherein said telescopic hydraulic lifting means may raise said front end of said hopper through an arc of at least 60°.

* * * * *